United States Patent [19]
Bishop

[11] Patent Number: 6,058,265
[45] Date of Patent: May 2, 2000

[54] ENABLING TROUBLESHOOTING OF SUBROUTINES WITH GREATEST EXECUTION TIME/INPUT DATA SET SIZE RELATIONSHIP

[75] Inventor: John Bishop, Nashua, N.H.

[73] Assignee: Hewlett Packard Company, Palo Alto, Calif.

[21] Appl. No.: 08/953,548

[22] Filed: Oct. 21, 1997

[51] Int. Cl.$^7$ ....................................... G06F 9/44
[52] U.S. Cl. .................. 395/704; 395/709; 395/708; 395/707; 395/705
[58] Field of Search ..................... 395/764, 704, 395/709, 708, 707, 706, 705, 703, 702, 701, 710, 712

[56] References Cited

U.S. PATENT DOCUMENTS

| | | | |
|---|---|---|---|
| 3,800,291 | 3/1974 | Cocke et al. | 340/172 |
| 4,435,758 | 3/1984 | Lorie et al. | 364/200 |
| 4,782,444 | 11/1988 | Munshi | 364/300 |
| 4,881,170 | 11/1989 | Morisada | 364/200 |
| 4,965,724 | 10/1990 | Utsumi et al. | 364/200 |
| 4,991,088 | 2/1991 | Kam | 364/200 |
| 5,161,216 | 11/1992 | Reps et al. | 395/375 |
| 5,212,794 | 5/1993 | Pettis et al. | 395/700 |
| 5,327,561 | 7/1994 | Choi et al. | 395/700 |
| 5,485,612 | 1/1996 | Ota et al. | 395/650 |

OTHER PUBLICATIONS

William Blume et al. Performance Analysis of Parelizing Compilers on the Perfect Benckmarks Programs IEEE Transactions, Nov. 1992.

Banjaree et al. "Automatic Program Parallelization" IEEE pp. 211–243, Feb. 1993.

*Primary Examiner*—Robert W. Downs
*Assistant Examiner*—Todd Ingberg

[57] ABSTRACT

The method of the invention analyzes program components from a program to determine a set of subroutines whose execution time, for increasing input data set sizes, is predicted to increase at a rate that is more rapid than the rate exhibited by other subroutines in the program. The method of the invention includes the steps of: applying a plurality of different size data sets to the program; executing the program with each different size data set; determining execution times for each program component in the program for execution runs of the program; analyzing the execution times for each program component to determine a set of finite differences between execution times, during succeeding runs; and determining from sets of finite differences, which program components exhibit a largest growth in execution time, for increasing sizes of input data set size.

12 Claims, 2 Drawing Sheets

ENABLING TROUBLESHOOTING OF SUBROUTINES WITH GREATEST EXECUTION TIME/INPUT DATA SET SIZE RELATIONSHIP

FIELD OF THE INVENTION

This invention relates to program optimization processes and, more particularly, to a method and apparatus for analyzing a program to determine subroutines whose execution times are most sensitive to an input data set's size.

BACKGROUND OF THE INVENTION

Performance evaluation of software programs and revision of such programs to arrive at more efficiently executing programs are difficult and time consuming tasks. For instance, certain program performance problems are difficult to locate. In this regard, it may neither be convenient nor possible to analyze a program's performance using a real data set as the data set may either be unavailable or may be so large as to create a very long run. Further, it may be difficult to tell whether a code change has improved a program's performance or not, as the execution differences may either be subtle or may be offset by changes in an opposite direction by other code changes. Various software performance analysis tools have been made available to enable a program under test to be "dissected" in such a manner as to enable analysis of individual segments of the program listing.

A first type of performance analysis tool is represented by "PUMA" (offered by the Assignee of this application) which suspends a program's execution, periodically, takes samples of the program's current state values and records the samples in a file. Thereafter, the samples are analyzed and data is determined which enables the programmer to determine what fraction of the total elapsed time was spent in each segment. Thus, the PUMA tool enables performance data to be accumulated with respect to various selected segments of a program's listing.

A further performance analysis tool is a Unix utility entitled: "gprof". That tool inserts instructions into the executable code and then causes the program code to execute. Each time a subroutine in the code is called, the inserted instruction causes the count for that subroutine to be incremented. After the program has completed a run, the incremented count values are indicative of the number of times a subroutine has been called. These count values enable the programmer to select the "most active" portions of the program for analysis and optimization.

While the gprof utility does provide an indication of activity experienced by various subroutines and instructions in a program listing, it does not provide an indication of the relationship between a subroutine's execution time and the size of an input data set to the subroutine. For instance, it is known that certain subroutines exhibit execution times that are insensitive to input data set size. These subroutines are known as zero order (or "constant") routines. A subroutine which exhibits a relatively linear increase in execution time with data set size is known as a first order (or "linear") routine. A subroutine which exhibits an exponential increase in execution time with increases in data set size (where the exponent is approximately two), is known as a second order (or "quadratic") routine. Otherwise, a subroutine can be classified as an "ith" order routine, where i is the value of the exponent which fits the rate of increase of execution time, with input data set size, of the subroutine. Clearly, the larger the order of the subroutine, the more sensitive is its execution time to the size of the input data set. Accordingly, it is the larger order subroutines which should be optimized first by the programmer, before effort is applied to other subroutines whose execution times are less sensitive to input data set sizes.

Accordingly, there is a need for an improved method and apparatus for determining a relationship of subroutine execution time to input data set size. Further, the method should be operable without requiring use of full size data sets. Such a method will enable identification of those subroutines which are most sensitive to input data set size and allow a programmer to concentrate on optimization thereof.

SUMMARY OF THE INVENTION

The method of the invention analyzes program components from a program to determine a set of subroutines whose execution time, for increasing input data set sizes, is predicted to increase at a rate that is more rapid than the rate exhibited by other subroutines in the program. The method of the invention includes the steps of: applying a plurality of different size data sets to the program; executing the program with each different size data set; determining execution times for each program component in the program for execution runs of the program; analyzing the execution times for each program component to determine a set of finite differences between execution times, during succeeding runs; and determining from sets of finite differences, which program components exhibit a largest growth in execution time, for increasing sizes of input data set size.

DETAILED DESCRIPTION OF THE INVENTION

Figure 1:
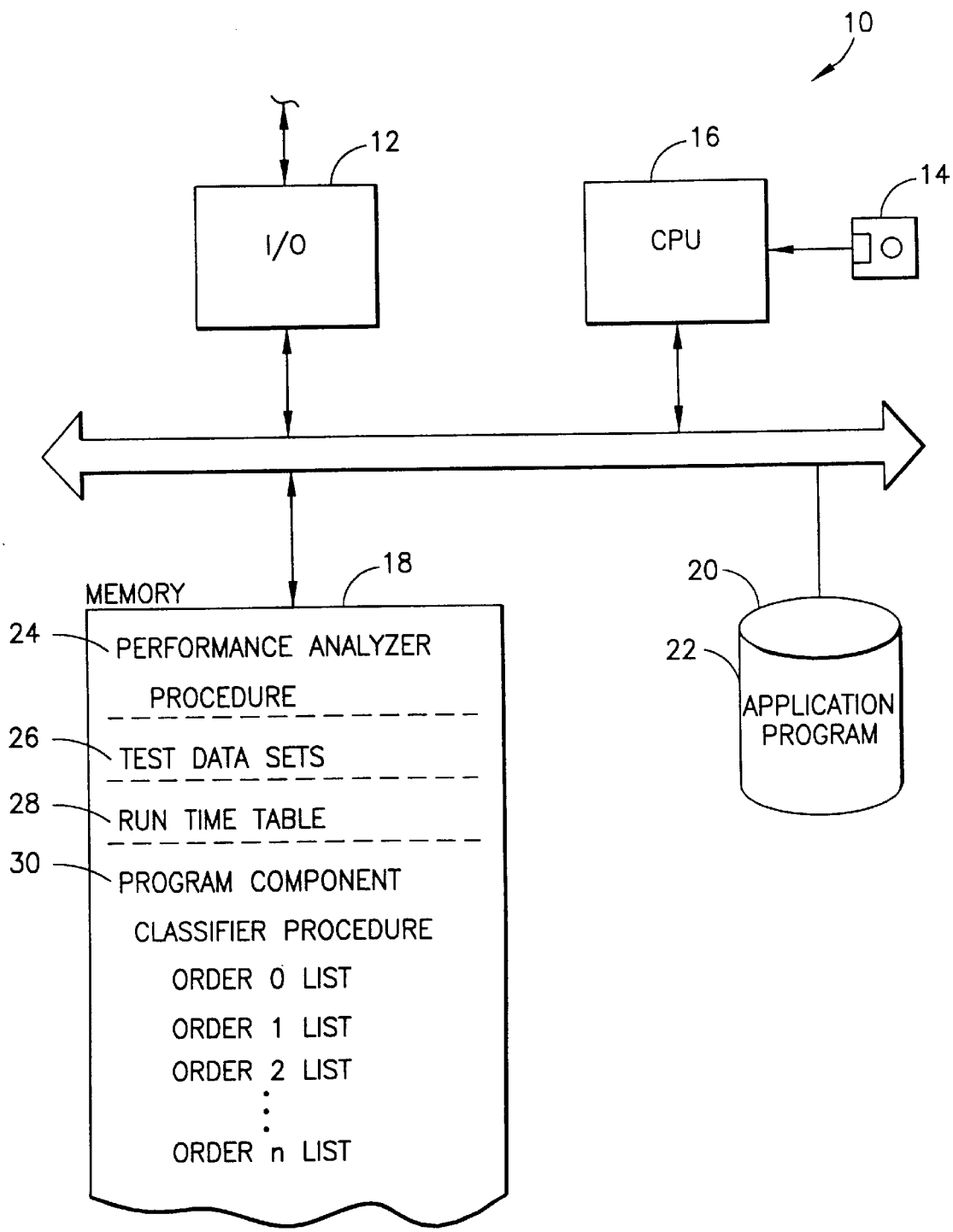
FIG. 1 is a high level block diagram of a system for performing the method of the invention.
Figure 2:
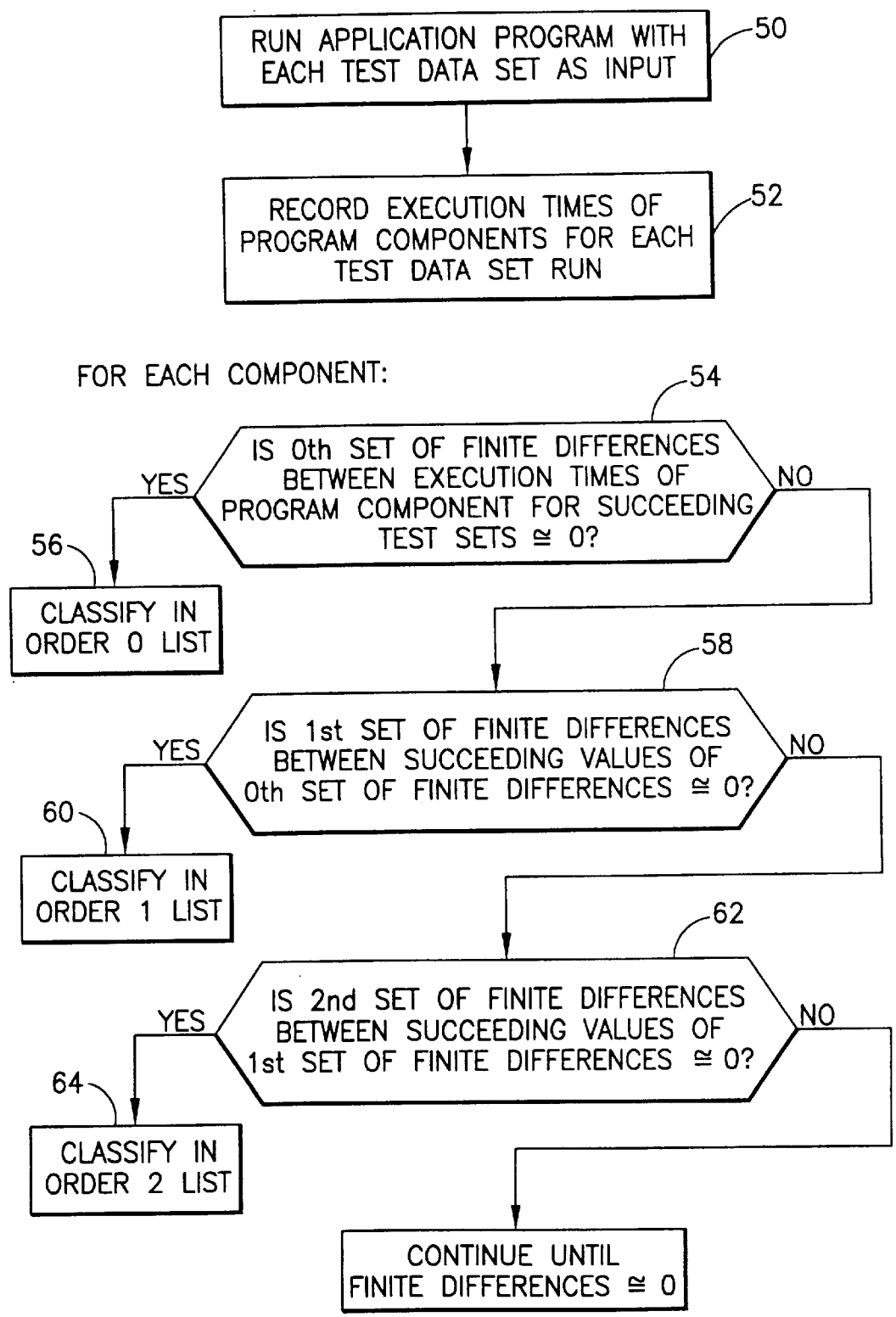
FIG. 2 is a high level logic flow diagram illustrating the method of the invention.

Referring to FIG. 1, a processor 10 is adapted to perform the method of the invention. An application program is entered into processor 10, either via input/output module 12 or via a memory disk 14. Central processing unit (CPU) 16 controls the overall functioning of processor 10 and, in combination with the routines contained in memory 18, performs the method of the invention.

A direct access storage device 20 is employed to store portions of an application program 22, both prior to and after processing by a performance analyzer 24 that is contained within memory 18. Performance analyzer 24 enables CPU 16 to perform an analysis of the various program components within application program 22. During the course of the analysis, plural test data sets 26 are applied as inputs to application program 22 and the execution time of each subroutine or program component within application program 22, for each data set, is recorded in run time table 28.

Note that test data sets 26 are generally much smaller than an input data set which would be experienced during the actual running of application program 22. Further, test data sets 26 comprise a set of increasing size data sets to enable performance analyzer 24 to assess the changes in program component run time for the different size data sets.

Performance analyzer 24 also includes a program component classifier procedure 30 which classifies each program component into one of a plurality of lists, depending upon the execution order value determined for the program component. As will be understood from the description below, the execution order value is determined by a procedure which derives a set of finite differences between run times for each program component (until an approximately 0 finite difference set is found), in response to the different size data sets. The number of derived "non-zero" finite difference sets is indicative of the order of complexity of the program component is determined. More specifically, if the finite differences between execution times of a program component, in response to a variety of test data set sizes is 0, then the program component is assigned to the order 0 list. If an initial set of finite differences of execution times indicates other than approximately 0 values, a second set of finite differences is derived and, assuming the second set results in approximately 0 finite differences, the program component is assigned to the order 1 list, indicating that its increase in execution increase time with data set size is predicted to be approximately linear. The procedure continues determining finite differences until an approximately 0 set of finite differences is calculated, or the finite differences start to increase (which is, in most cases, the result of an accumulation of errors). At such point, the number of times the finite differences have had to be calculated equates to the predicted sensitivity of the execution time of the program component to increases in data set size.

Analysis of a program listing in accordance with program component classifier procedure 30 will be further understood by referring to FIG. 3 and a specific example which follows the description of FIG. 3. As shown in box 50, initially application program 22 is executed, using each test data set 26 as an input. During the execution of application program 22, the execution times of the program components thereof are recorded, for each test data set run (box 52). Thereafter, for each program component, it is determined whether a set of finite differences between the execution times of a program component, for succeeding data set sizes, is approximately 0 (decision box 54). If yes, the program component's execution time is essentially independent of data set size and the subroutine is classified in the order 0 order (box 56).

If the first set of calculated finite differences do not result in approximately 0 values, the procedure moves to decision box 58 wherein a further set of finite differences, between succeeding values of the first set of finite differences, is calculated and it is determined if the difference results are approximately equal to 0. If yes, it is concluded that the program component execution time varies approximately linearly with data set size and the program component is classified into the order 1 list (box 60).

If decision box 58 indicates that the finite difference values are not equal to approximately 0, then a next set of finite differences is calculated between succeeding values of the last set of finite differences (decision box 62). A determination is then made whether the resulting finite differences are approximately 0. If yes, the program component is classified into the second order set (box 64), with the conclusion being that the program component's execution time varies at an approximate quadratic rate with increases in data set size. The procedure continues from decision box 62 until the finite difference values calculated are approximately equal to 0, at which time the procedure is at an end.

At such time, the program components have been segregated into a series of increasing order lists, with program components in the highest order of list being those which are predicted to be most sensitive, in regards to execution time, to data set input size. Thus, with increased data set sizes, those highest order program components are predicted to exhibit the largest increases in execution time and thus, should be examined first by the programmer, for optimization purposes.

The example given below will further illustrate the procedure of the invention in regards to a specific set of execution size values.

Assume a program P is to be examined and includes four program components, i.e., P1, P2, P3 and P4. Further, program P operates on data files. The bigger the data file, the longer the program will run. The principal interest is to find which components of P are most sensitive to the size of the data file, so that optimization actions can be taken to speed up execution of those components and not to waste time speeding up components whose execution time is less sensitive to input data set size.

Assume that running P on a "real" problem would take hours or days, but that there are a number of tiny datafiles (i.e., "data sets") for testing use, which P can handle in a few minutes. To make things easier, these files' sizes bear a simple relation to each other:

F1 is of size 1, F2 of size 2, F3 of size 3 and so on to F6. Real files will have sizes on the order of a thousand or ten thousand units.

Assume that the program components have the following characteristics (which are to be discovered):

P1 always takes the same amount of time, no matter how big is the data set being worked on. In particular, P1 takes 10000 units of time.

P2 takes an amount of time which depends on the size of the data file. In particular it takes 1000 times the data file's size (in the arbitrary time units being used).

P3 takes an amount of time which depends on the square of the data file size, in particular, 100 times the square.

P4 takes an amount of time which is the cube of the datafile size.

It is clear that for small data sets, P1 is the component of the application program which takes the most time, while for large data sets, P4 is the most time-consuming component. The goal of program component classifier 30 (FIG. 1) is to discover this.

The procedure starts by collecting data on six runs of application program P on the six data files. Using Performance Analyzer 24, an analysis can be performed to determine the total time for each run and to allocate it among the program components:

| Run number (and size) | P1 time | P2 time | P3 time | P4 time |
| --- | --- | --- | --- | --- |
| 1 | 10000 | 1000 | 100 | 1 |
| 2 | 10000 | 2000 | 400 | 8 |
| 3 | 10000 | 3000 | 900 | 27 |
| 4 | 10000 | 4000 | 1600 | 64 |
| 5 | 10000 | 5000 | 2500 | 125 |
| 6 | 10000 | 6000 | 3600 | 216 |

For each column, program component classifier procedure 30 forms a series of finite differences, stopping whenever the difference is zero. The difference is found by subtracting the value for the next run from the value for this run.

For P1, the first set of differences is zero:

| (0) | (1) |
|---|---|
| 10000 | 0 |
| 10000 | 0 |
| 10000 | 0 |
| 10000 | 0 |
| 10000 | 0 |
| 10000 | |

This indicates that P1 has a "constant" order of complexity, that is, it is insensitive to the size of the input data set. The value in the first column indicates the actual number of time units P1 takes, i.e., 10000.

For P2, the second set of differences is zero:

| (0) | (1) | (2) |
|---|---|---|
| 1000 | 1000 | 0 |
| 2000 | 1000 | 0 |
| 3000 | 1000 | 0 |
| 4000 | 1000 | 0 |
| 5000 | 1000 | |
| 6000 | | |

The finite differences in column (0) indicate that P2 has a "linear" order of complexity, and the finite difference entries in column (1) indicate that P2 takes (1000 times the problem size) time units.

For P3, the third set of differences is zero:

| (0) | (1) | (2) | (3) |
|---|---|---|---|
| 100 | 300 | 200 | 0 |
| 400 | 500 | 200 | 0 |
| 900 | 700 | 200 | 0 |
| 1600 | 900 | 200 | |
| 2500 | 1100 | | |
| 3600 | | | |

The above set of finite differences indicates that P3 has "quadratic" complexity, and consumes time proportional to the square of the size of the problem (100 times that square).

Finally, P4 turns out to be the place where effort should be concentrated to improve performance: it has zeros in the fourth column.

| (0) | (1) | (2) | (3) | (4) |
|---|---|---|---|---|
| 1 | 7 | 12 | 6 | 0 |
| 8 | 19 | 18 | 6 | 0 |
| 27 | 37 | 24 | 6 | 0 |
| 64 | 61 | 30 | 0 | |
| 125 | 91 | 0 | | |
| 216 | 0 | | | |

The above finite differences indicate that P4 takes time proportional to the cube of the problem size. So, even though P4 is taking only 216 units on the smallest test data file, it can be predicted that for a real size data file, it will be the processing time spent in the P4 portion of P that will count.

In general, since sample-taking is not perfect, the data generated by performance analyzer 24 is not entirely accurate, causing the resultant calculations to exhibit small error values. A number of techniques can be used to compensate for these errors. First, program component classifier procedure 30 can be caused to report that a particular program component "appears" to have quadratic complexity). Second, a column of numbers whose values are "near" zero can be treated as being zero, by using predetermined thresholds to establish boundaries defining a zero value. Third, if a pattern of shrinking differences is observed, an apparent zero column can be detected.

It can occur that a component of a program will have mixed complexity. This can be handled as follows. Consider a component P5, which consumed time in this manner:

| 1 | 101 |
|---|---|
| 2 | 204 |
| 3 | 309 |
| 4 | 416 |
| 5 | 525 |
| 6 | 636 |

The following finite differences would be calculated:

| 101 | 103 | 2 | 0 |
|---|---|---|---|
| 204 | 105 | 2 | 0 |
| 309 | 107 | 2 | 0 |
| 416 | 109 | 2 | |
| 525 | 111 | | |
| 636 | | | |

The zero in the third difference indicates a quadratic relationship, and the values in the other columns indicate that P5 consumes time according to the formula: (100*problem size)+(square of problem size). This is covered by first finding that P5 has a quadratic term and then using the average value in the previous column to find the size of the quadratic's contribution (in this case it is 1 times the square). That can then be subtracted from the raw data and the differences recomputed. In practice, a number of computational short-cuts are possible which allow direct operation on the existing set of differences. For instance, the modified differences are looked at again for a new zero column, and thus a secondary complexity order. This process can be repeated.

It should be understood that the foregoing description is only illustrative of the invention. Various alternatives and modifications can be devised by those skilled in the art without departing from the invention. For instance, the above examples used data sets that were in a simple arithmetical progression (1,2,3,4 . . . ). This was done to simplify the examples. Often real data sets, while of different sizes, will not have sizes that exhibit such a linear relationship. When such is the case, the finite differences have to be scaled to account for the different data set sizes. In order to analyze the finite differences and find the order of a progression: a zero order relation is unscaled, a first order relation is scaled by the size of the data set, a second order relation is scaled by the square of the size of the data set, and so on. Accordingly, the present invention is intended to embrace all such alternatives, modifications and variances which fall within the scope of the appended claims.

I claim:

1. A method for analyzing a program to determine a set of components thereof whose execution times, for increasing input data set sizes applied to said program, are predicted to increase at a rate that is more rapid than other components of said program, said method comprising the steps of:

a) applying a plurality of different size data sets to said program;

b) executing said program with each of said different size data sets;

c) determining execution times for each said component of said program for each execution run of said program;

d) analyzing said execution times for each said component to determine a set of differences between succeeding execution times of succeeding runs; and e) determining from sets of said differences, which components exhibit a largest growth of execution time in relation to increasing size data input sets to said program.

2. The method as recited in claim 1, further comprising the step of:

f) listing components which exhibit a like growth of execution time in relation to increasing size data input sets, into respective corresponding lists.

3. The method as recited in claim 1, wherein said different size data sets exhibit no preset relationship to a data set expected to be applied to said program during operational use thereof.

4. The method as recited in claim 1, wherein said analyzing step d) concludes when a new set of differences calculated from a previous set of differences approximate a zero value.

5. The method as recited in claim 4, wherein said analyzing step d) determines that said new set of differences calculated from said previous set of differences approximate zero values by comparing individual values of said new set of differences to a predetermined threshold.

6. The method as recited in claim 1, wherein said determining step e) finds which set of components exhibit a largest growth of execution time by assessing, for each component, a number of times a set of non-zero differences result from analyzing step d), and assigning components which exhibit a largest number of times value to said set of components that exhibit a largest growth of execution time.

7. A memory media for controlling a processor to analyze a program to determine a set of components thereof whose execution times, for increasing input data set sizes applied to said program, are predicted to increase at a rate that is more rapid than other components of said program, said memory media comprising:

a) means for controlling said processor to apply a plurality of different size data sets to said program;

b) means for controlling said processor to execute said program with each of said different size data sets;

c) means for controlling said processor to determine execution times for each said component of said program for each execution run of said program with said different size data sets;

d) means for controlling said processor to analyze said execution times for each said component to determine a set of differences between succeeding execution times of succeeding runs; and e) means for controlling said processor to determine from sets of said differences, which components exhibit a largest growth of execution time in relation to increasing size data input sets to said program.

8. The memory media as recited in claim 7, further comprising:

f) means for controlling said processor to list components which exhibit a like growth of execution time in relation to increasing size data input sets, into respective corresponding lists.

9. The memory media as recited in claim 7, wherein said different size data sets exhibit no preset relationship to a data set expected to be applied to said program during operational use thereof.

10. The memory media as recited in claim 7, wherein said means d) concludes operation when a new set of differences calculated from a previous set of differences approximate a zero value.

11. The memory media as recited in claim 10, wherein said means d) determines that said new set of differences calculated from said previous set of differences approximate a zero value by comparing individual values of said new set of differences to a predetermined threshold value.

12. The memory media as recited in claim 7, wherein said means e) finds which set of components exhibit a largest growth of execution time by assessing, for each component, a number of times a set of non-zero differences result from analyzing step d), and assigning components which exhibit a largest number of times value to said set of components that exhibit a largest growth of execution time.

* * * * *